April 27, 1965

R. WILLIAMS 3,180,229

METHOD FOR FORMING ROTORS

Filed Feb. 19, 1962

INVENTOR.
ROBERT WILLIAMS
BY Joseph W. Holloway
ATTORNEY

April 27, 1965  R. WILLIAMS  3,180,229
METHOD FOR FORMING ROTORS
Filed Feb. 19, 1962  3 Sheets-Sheet 2
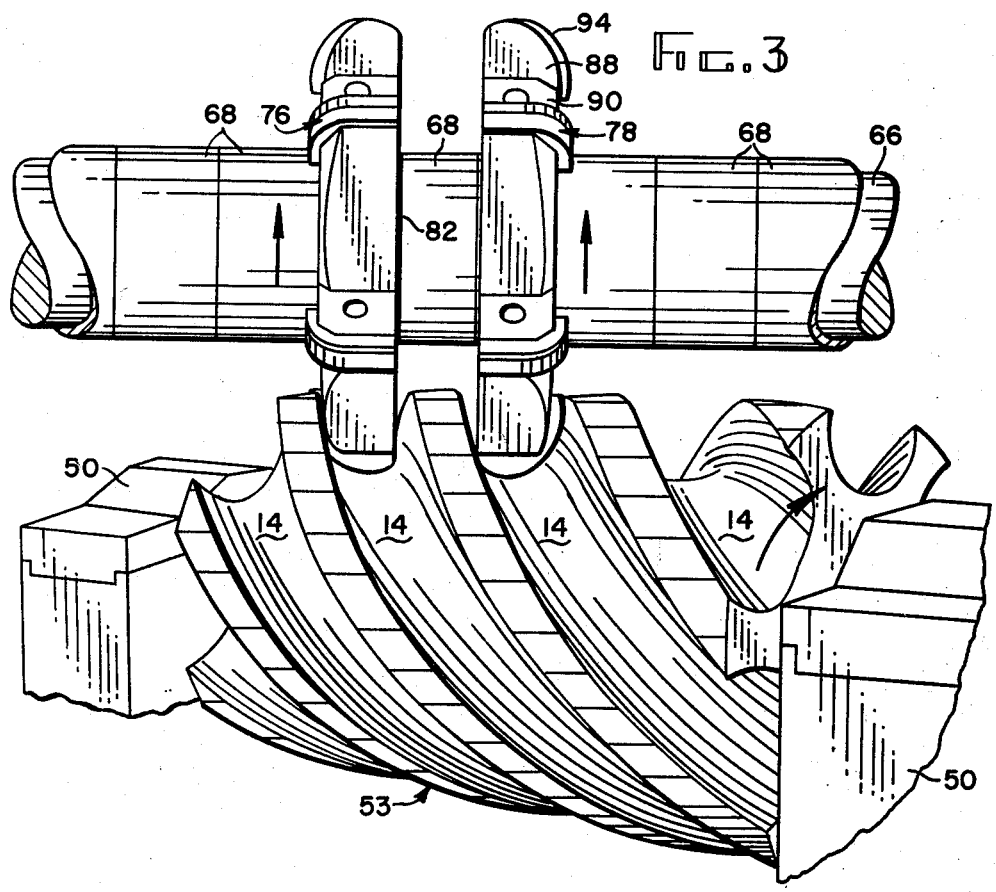
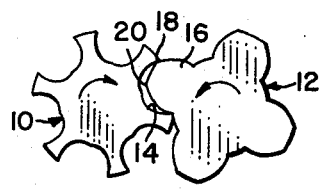
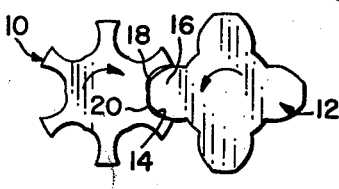
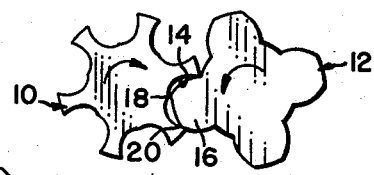

United States Patent Office 3,180,229
Patented Apr. 27, 1965

3,180,229
METHOD FOR FORMING ROTORS
Robert Williams, Quincy, Ill., assignor to Gardner-Denver Company, a corporation of Delaware
Filed Feb. 19, 1962, Ser. No. 174,059
3 Claims. (Cl. 90—11.4)

This invention generally relates to an improved method for forming helically grooved rotors employed in axial flow fluid pumps such as blowers, compressors and the like.

Devices of the aforesaid type are conventionally provided with intermeshing rotary screw members having complementary helical lobes and grooves. The screw members are commonly referred to as the main rotor and the gate rotor, the former having addendum lobes and the latter having dedendum grooves. In rotors of the kind to be presently considered, the lobes and grooves of the rotors have generated forms, the convex lobe flanks being generally described by moving crest edges of the grooves and the concave groove flanks being generally described by the moving crest edges of the lobes. Crest edges at the opening of a gate rotor groove are defined by intersections of the concave flanks of the groove with the cylindrical outer surface of the rotor. Due to the generated shape of the groove flanks, the crest edges of the groove may be somewhat re-entrant, i.e. in a plane perpendicular to the helix of the groove, the distance between crest edges of the groove is less than the distance between the groove flanks at their point of greatest separation.

In the manufacture of such rotors, cutting the re-entrant crest portions of the gate rotor grooves presents a difficult machining operation which, heretofore, has not been satisfactorily accomplished by means of conventional apparatus for forming spiral shapes on metal bodies. Various prior art machines and methods used in conjunction therewith have been proposed as solutions for the above-defined problem; however, the proposed machinery and methods involve expensive special equipment and tools and costly training for machine operators. These shortcomings of the prior art machines and methods have seriously hampered commercial exploitation of axial flow fluid pumps embodying rotors of the generated type; consequently, rotors having what are believed to be less desirable configurations have been adopted by many manufacturers of this type of apparatus.

Therefore, a broad object of this invention is to provide an improved method for forming generated gate rotor grooves having re-entrant crest edges.

Another object is to provide a method for forming gate rotor grooves of the aforedescribed character with great speed and accuracy and at low cost by means of conventionally constructed and operated apparatus, such as milling machines.

A more specific object is to provide a method for forming gate rotor grooves of the aforedescribed character, wherein a pair of rotary form cutters are mounted in spaced-apart parallel relation upon an arbor, and a gate rotor blank is longitudinally fed relative to the cutters at a preselected angle to the rotary axis of the cutters.

Yet another specific object is to provide a method for forming gate rotor grooves of the aforedescribed character, wherein arbor-mounted rotary cutters are employed to cut concurrently the opposite flanks and crest edges of adjacent grooves during one relative longitudinal traversal of the cutters and the rotor blank.

Still another specific object is to provide a method for forming gate rotor grooves of the aforedescribed character, wherein the opposite flanks and crest edges of a given groove are cut during successive longitudinal traversals of the cutters and the rotor blank.

These and other more specific objects and advantages will appear upon reading the following specification and claims and upon considering in connection therewith the attached drawings to which they relate.

In the drawings:

FIG. 3 is an enlarged fragmentary view of the cutting elements and the rotor blank shown in FIG. 1.

FIGS. 6, 7 and 8 are end views of intermeshing main and gate rotors showing respectively the main rotor entering the gate rotor, the rotors in full engagement, and the main rotor leaving the gate rotor.

Figure 1:
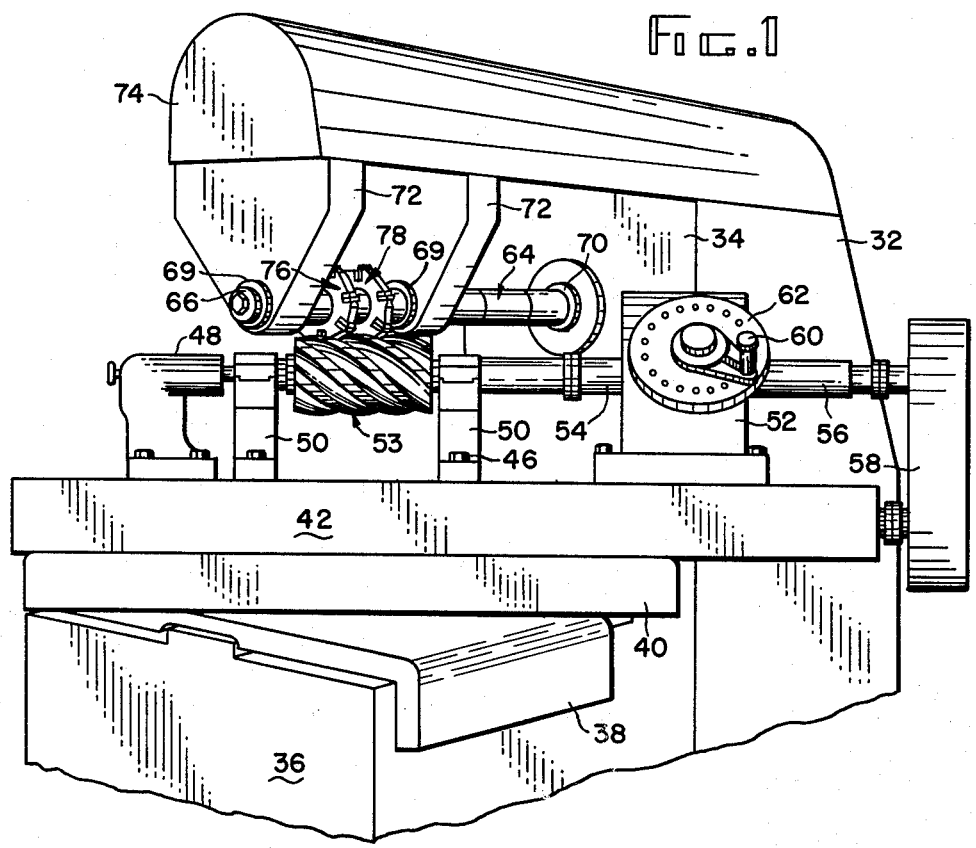
FIG. 1 is a fragmentary plan view of a milling machine adapted to perform the novel rotor forming process which is the subject of the present invention.

Screw-type, axial flow fluid pumps conventionally include a pair of mating rotors having suitably formed helical lobes and grooves which mesh as the rotors are rotated in opposite directions. In the drawings, FIGS. 6 through 8 diagrammatically illustrate this meshing action of a gate rotor 10 with a main rotor 12, wherein helical gate rotor grooves 14 receive helical main rotor lobes 16 as the rotors rotate in timed relation. In practice, the rotors are supported within a housing, not shown, having inlet and outlet ports which supply and exhaust fluid to and from axially movable working chambers defined by the rotors and housing. Since the general structural and operational features of pumps of the aforesaid type are well understood, further description of these features is unnecessary.

The profile of the rotor grooves and lobes, viewed from the ends of the rotors, as in FIGS. 6 through 8, may be of any selected configuration, provided only that the rotors cooperate to provide fluid working chambers without destructive interference between the meshing grooves 14 and lobes 16. One type of rotor profile which is particularly well suited for gas blower and compressor apparatus is the so-called generated profile which is described by generating points on the rotors as the rotors mesh together. This generating action is illustrated sequentially in FIGS. 6 through 8 which show the lobe 16 as it enters the groove 14, as it meshes fully with the groove, and as it is about to leave the groove. It will be understood that the crest edges 18 and 20 of the engaged lobe provide spaced generating points which describe the contour of the gate rotor groove 14. In a similar manner the crest edges 22 and 24 of the engaged groove 14 provide generating points which describe the lobe contour. One consideration favoring selection of a generated rotor profile is that, in gas-handling apparatus, the crest edges of the respective rotors provide at all times two or more interrotor sealing lines. In practice, the profile of the rotor grooves and lobes may deviate somewhat from that produced by true generation in order to provide a predetermined running clearance between the rotors and to simplify the contour of the bottom of the gate rotor groove. However, since some fluid-sealing capacity is normally desirable between the rotors, it is preferable that this deviation be as small as possible. While other arrangements may be selected, FIGS. 6 through 8 indicate that the pitch circle of the meshing rotors coincides with the outer circumference of the gate rotor 10 and with the inner hub circumference of the main rotor 12 thereby providing fully dedendum grooves and fully addendum lobes.

Figure 5:
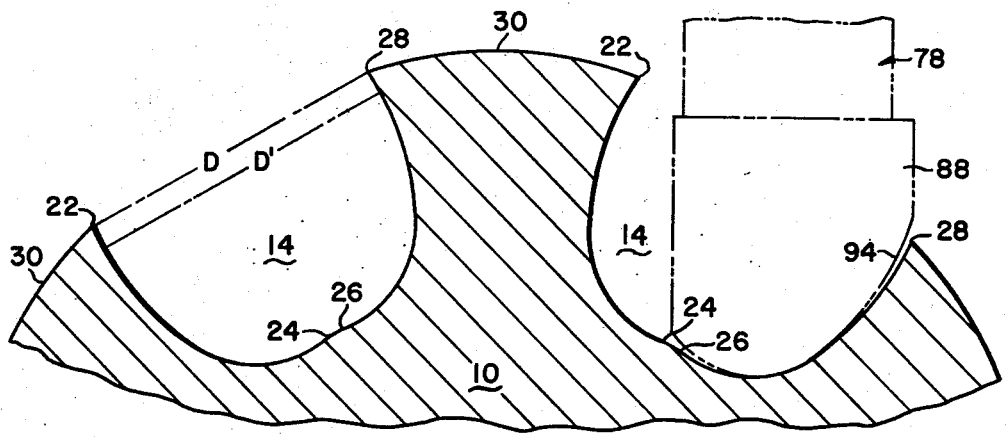
FIG. 5 is an enlarged sectional view taken in a plane perpendicular to the helix of the gate rotor.

The enlarged view of the gate rotor 10, shown in FIG. 5, illustrates a groove profile which is substantially generated by the method described above. Viewed at right angles to the helix of the gate rotor 10, each groove 14 comprises opposite flank surfaces 22–24 and 26–28 and a small connecting flat 24–26 at the bottom of the groove. The groove crest edges 22 and 28 are sharply defined by intersections of the flank surfaces with the cylindrical outer surface 30 of rotor 10. The crest edges 22 and 28 of each groove tend to close the opening of the groove 14 at the periphery of the gate rotor 10, i.e. the dimension D at the groove opening is less than the dimension D' at the place of greatest separation of corresponding points on flanks 22–24 and 26–28. This characteristic of the described generated groove profile will hereinafter be referred to as a condition of re-entrance of the groove crest edges.

While generated profiles of the aforedescribed type have been known in the art for many years, these profiles have failed to receive general acceptance by manufacturers of fluid pump devices of the type under consideration. This lack of commercial interest stems largely from the fact that gate rotor grooves having generated or substantially generated profiles have heretofore been extremely difficult and expensive to machine. In the past, rotor forming machines have been designed for cutting helical rotor grooves by duplicating the foredescribed generating action of the main rotor lobes; however, these expensive special machines are believed to be poorly suited for rapid, low-cost fabrication of rotors on a mass production basis. Attempts to form gate rotors having re-entrant crests without resort to special machines, i.e. by the use of standard machine shop equipment, have been largely unsuccessful due to lack of speed and precision. Moreover, costly hand fitting and finishing of the mating main and gate rotors render this method of forming rotors commercially impractical. As a consequence, most manufacturers are presently obligated to employ generally semicircular profiles because the latter present a simpler, less expensive machining task. Therefore, the principal object of the present invention is to overcome the above-enumerated difficulties present in available methods for forming generated gate rotor grooves by providing a improved method for fast, accurate, and low-cost manufacture of these articles by means of standard machine shop equipment.

Figure 4:
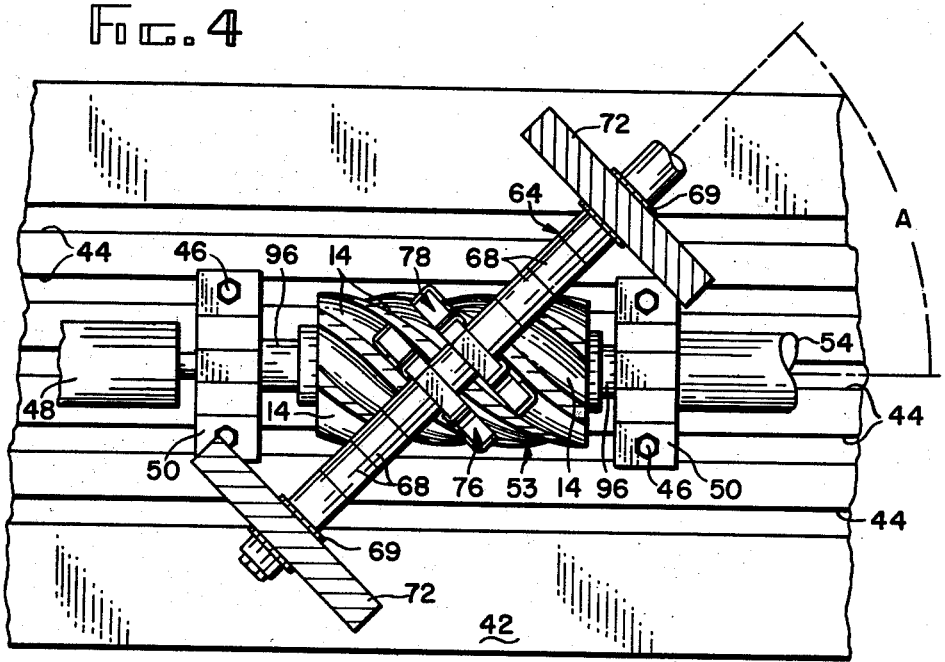
FIG. 4 is a fragmentary plan view of the cutting elements and the rotor blank shown in FIG. 1.

A preferred means for carrying out the improved method comprises a conventional universal knee-and-column milling machine, illustrated in simplified form in FIGS. 1, 3 and 4. The illustrative milling machine generally comprises a column 32 having a column face 34 which guides a knee 36 for vertical travel therealong. The knee is supported by an elevating screw, not shown, which provides vertical adjustment for the knee. The knee 36 projects horizontally from the column and supports a saddle 38, a table support 40, and a table 42. The saddle 38 swivelly supports and carries the table support 40 and is adjustable transversely on horizontal guiding surfaces located on top of the knee. The table support 40 supports the table 42 for swivelling movements in horizontal planes and carries the table for longitudinal travel along guiding slots on top of the table support. The table 42 is longitudinally advancetable and retractable along the table support 40 by a motor driven lead screw, or an equivalent means, at a preselectable feed rate. The top or working surface of the table 42 is provided with a series of T-slots 4, shows in FIG. 4, which receive T-bolts 46 for locating and clamping a tailstock 48, a pair of spaced work supporting fixtures 50, and a universal dividing head 52. The work, in this instance a gate rotor blank 53, is located on centers provided by the dividing head 52 and the tailstock 48 and is rotatably supported by the fixtures 50 for rotation by the output shaft 54 of the dividing head 52. In a well-understood manner, the input shaft 56 of the dividing head is driven by the aforementioned table lead screw through change gearing disposed in a gear housing 58, whereby the rotor blank 53 is rotatable in timed relation to the longitudinal movement of the table 42. The change gears permit varying the relation between the table feed rate and the rotational speed of the rotor blank and, accordingly, the lead of the helical grooves 14 formed thereon. The dividing head 52 includes the usual indexing mechanism for accurately spacing grooves 14 angularly around the periphery of the rotor blank. The operating handle 60 and index plate 62 of the indexing mechanism are shown in FIG. 1.

An arbor assembly, indicated generally by numeral 64 and comprising an arbor shaft 66, spacer collars 68 and bearing collars 69, is rotated by a motor-driven spindle 70 extending from column face 34. The arbor assembly is journalled and supported by spaced arbor supports 72 which are adjustably carried by the milling machine overarm 74. A pair of milling cutters, 76 and 78, are drivably attached to arbor shaft 66 by means of keys 80; and, the cutters are accurately and rigidly located on arbor shaft 66 by means of spacer collars 68. As shown in FIG. 3, the cutters may be selectively spaced with great accuracy by means of a spacer collar 68 in combination with one or more shims 82.

Figure 2:
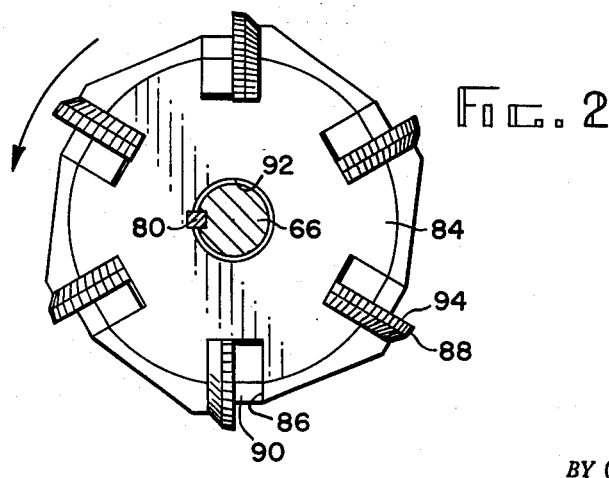
FIG. 2 is a plan view of a cutting element shown in FIG. 1.

As best illustrated in FIGS. 2 and 3, the preferred milling cutters are of the formed-profile type and generally comprise a body 84 having a number of evenly spaced slots 86 opening to the perimeter of the body and a like number of straight cutting teeth 88 carried in the slots and removably secured therein by wedges 90. A central opening 92 in the cutter body receives the arbor shaft 66 to which the cutter body is nonrotatably secured by means of key 80. Each cutter tooth 88 has a cutting edge 94 displaying a preferred frontal profile illustrated in FIGS. 3 and 5. The cutting edges of the teeth of cutter 76 are reversely turned with respect to the cutting edges of the teeth of cutter 78; and, the teeth of both cuters are mounted on associated cutter bodies in such a manner that the cutting edge of each tooth faces in the same direction and projects radially and laterally outwardly from the slots 86. As viewed in FIG. 3, the cutting edges of cutter 76 project laterally to the left and the cutting edges of cutter 78 project laterally to the right. Hereinafter, for purposes of describing and claiming the present invention, the term "left-hand cutter" shall apply to cutter 76, or its equivalent; and, the term "right-hand cutter" shall apply to cutter 78 or its equivalent.

The gate rotor blank 53 on which the helical grooves 14 are to be cut may be cast oversize to the general shape of the finished gate rotor 10. Depending upon the amount of surface removal, the milling process may comprise one or more rough cuts and a finish cut. As will hereinafter appear, the present invention contemplates that the finish cut be accomplished by the aforedescribed cutters 76 and 78; however, the rough cut, if one is required, may be made in any suitable manner. Preferably, the circumferential outer surface of the gate rotor and the axially extending rotor shafts 96 are turned to size before the grooves 14 are milled.

Turning to certain of the steps included in the improved method for forming the gate rotor grooves 14, the rotor blank 53 is first mounted upon table 42 by means of the tailstock 48 and the fixtures 50 which retain and support the rotor shafts 96 while permitting rotation of the rotor blank about its longitudinal axis. The axis of rotation of the blank 53 and the axis of rotation of the cutters 76 and 78 lie in vertically spaced, parallel planes; and the cutters rotate in parallel planes which are perpendicular to their common axis of rotation. The cutters 76 and 78 are horizontally spaced on the arbor shaft 66 to locate the same for cutting opposite and remote portions of adjacent rotor grooves 14 in a manner to be more fully described. The axis of rotation of the blank 53 and the axis of rotation of the cutters 76 and 78 are vertically spaced so that cutting edges 94 of the teeth 88 will cut the entire flank and bottom surfaces of the grooves 14 substantially as shown in FIG. 3. This vertical distance is dependent on the diameters of the blank 53 and the cutters 76 and 78, respectively, and the depth of the preselected groove profile with respect to the circumferential outer surface 30 of the blank. The rotor blank is vertically adjusted by movement of the knee 36 to space the blank with respect to the cutters 76 and 78 for a preselected depth of cut conforming to the desired depth of the grooves 14. The axis of the rotor blank is located at a preselected angle to the axis of rotation of the cutters 76 and 78 by swivelling the table support 40 and the table 42 with respect to the saddle 38. This angle is indicated at A in FIG. 4; and, the selected size of the angle A depends on such factors as the contour of the grooves to be cut, the profile of the cutter teeth, the dimensions of the cutters and of the rotor blank, and the lead of the helix of the grooves. In practice it has been found that the angle A will substantially correspond to the selected helix angle of the grooves 14. Thus, for example, where the helix angle of grooves 14 was selected as 43° and with a lead of thirty inches per revolution of the blank 53, a table angularity of approximately 45° proved satisfactory for forming grooves having a profile of the character shown in FIG. 5.

With the rotor blank 53 mounted on table 42 to provide proper table angularity, cutting depth, groove location, and relative feed and rotation, the blank is fed longitudinally to the revolving cutters from right to left, as viewed in FIGS. 1 and 4, by a motor driven lead screw mechanism, not shown, which drives the table 42 for horizontal, reciprocal movement. During the feeding operation, the blank is rotated in the direction indicated by the directional arrow shown in FIG. 3 in timed relation to the longitudinal feeding action of the table 42. This timed relation of feed and rotation of the blank is produced, in a conventional manner, by the aforementioned dividing head 52 and the change gearing disposed in gear housing 58. It will be understood that the relation between feed and rotation of the rotor blank will be determined in accordance with the desired helix angle of the grooves 14.

In FIG. 3, the cutters 76 and 78 are shown in cutting relation with two grooves of the blank 53; and, it will be noted that the cutter teeth 88 of the respective cutters are in groove-forming engagement with the opposite and remote flank surfaces of adjacent grooves 14. As viewed in FIG. 3, the teeth of the left-hand cutter 76 are adapted to form flank surface 22-24 of one groove; and, the teeth of the right-hand cutter 78 are adapted to form flank surface 26-28 of an adjacent groove. After each traverse of the blank 53 through the cutters 76 and 78, the blank is indexed angularly by means of the dividing head 52 in such a manner that the cutters will be disposed in cutting relation with an adjacent pair of grooves. Referring to FIG. 3, indexing the blank upon completion of the indicated traverse of the blank would place the left-hand cutter 76 in the groove presently occupied by the right-hand cutter 78; and, accordingly, the right-hand cutter would be shifted to the next groove to the right. Preferably, the cutter teeth 88 are adapted to form slightly more than one half of the bottom flat 24-26 during each relative traverse of the cutters and the blank. In effect, one complete groove is cut during each relative traverse of the cutters and the blank; therefore, the required number of traversals corresponds to the number of gate rotor grooves.

Referring more particularly to the cutting action of the teeth 88, it will be understood that the profile of the teeth does not correspond to the profile of the groove flank being generated by the teeth. This would be the case for any cutter tooth adapted to generate a helical shape on a workpiece. The tooth profile will be determined with regard to the groove profile and helix angle and by the position of the work with respect to the cutters. In practice, the required configuration of the cutter teeth may be established empirically by known methods or may be computed. The aforementioned disparity between the groove profile and the cutter tooth profile is illustrated in FIG. 5 where a tooth 88 of a right-hand cutter 78, shown in phantom lines, is in contact with a finished groove flank 26-28, as viewed in a plane perpendicular to the groove helix. It will be seen that, at a given instant during the cutting operation, only a small portion of the cutting edge 94 of tooth 88 is actively in cutting engagement with the flank profile in a given plane perpendicular to the helix of the groove; however, as the given plane of the rotor blank is rotatably and longitudinally displaced with respect to the cutters, the changing active cutting portions of the tooth will generate the entire flank profile 26-28 as well as an adjacent portion of the flat 24-26. Furthermore, the active cutting portion of the teeth of the right-hand cutter 78 will move progressively from the bottom flat 24-26 to the crest edge 28, while the active cutting portion of the teeth of the left-hand cutter 76 will move progressively from the crest edge 22 to the bottom flat. This characteristic of the cutting sequence results from the manner in which the material of the rotor blank is presented to the revolving cutter teeth.

An important aspect of the present invention is the provision of a method whereby opposite and remote flanks of adjacent grooves are cut concurrently and opposite flanks of a given groove are cut successively by spaced right-hand and left-hand form cutters. These steps, in conjunction with others hereinbefore described, render it possible to mill gate rotor grooves having re-entrant crest edges, such as 22 and 28. Attempts to employ a single form cutter to mill concurrently both flanks of the same groove have failed due to the back-cutting action of the cutters which cuts away the re-entrant crests.

The use of a pair of spaced rotary form cutters for forming gate rotors provides other ancillary benefits. For example, the accuracy of angular spacing between adjacent grooves 14 is controllable to the same degree of exactitude provided by the indexing apparatus of the dividing head 52. Since the cutters are operating on opposed surfaces of the rotor blank, certain distortions of the blank are reduced thereby enhancing the accuracy of location and contour of the grooves. Furthermore, provision of a method whereby conventional machines and previously acquired operator skills may be employed obviates expenses involved in the purchase of special equipment and in operator training. Moreover, the speed with which the aforedescribed method may be used to cut conventional rotor materials facilitates rapid, less costly rotor production.

It will be appreciated that the aforedescribed method for forming rotors is not limited to the illustrative milling machine means for performing the method. The method can be utilized with any equivalent apparatus or machine adapted to effect relative traversals of a blank and a pair of cutters substantially in the aforedescribed manner. Although the described method is particularly well suited to form helical grooves having generated contours with re-entrant crest edges, it will be appreciated that the speed and accuracy obtainable from this method would facilitate cutting grooves having nongenerated contours. Furthermore, the method is not limited to applications involving meshing rotors, but may be advantageously employed for forming a plurality of spaced helical grooves on a blank. Moreover, it will be understood that the above description and accompanying drawings comprehend only a general and preferred embodiment of the invention and that various changes in the number and sequence of operational steps may be made without sacrificing any of the above-enumerated advantages or departing from the scope of the appended claims.

What is claimed as new and useful is:

1. The method for making rotors having spaced helical grooves with concave flanks and re-entrant crest edges, comprising these steps:

positioning a rotor blank in groove-forming, traversing relation with spaced parallel rotary cutters having cutting edges extending substantially on one side only;

effecting groove-forming traversals of said blank and said cutting means;

rotating said blank in timed relation to the traversing movement to provide a desired groove helix angle;

respectively cutting opposite concave flanks and crest edges of a given groove only during successive groove-forming traversals; and, concurrently cutting only opposite and remote concave flanks and crest edges of adjacent grooves during each groove-forming traversal.

2. The method for making rotors having spaced helical grooves with concave flanks comprising the following steps:

positioning a rotor blank in groove-forming, traversing relation with a pair of spaced rotary cutters having cutting edges extending substantially on one side only;

effecting groove-forming traversals of said blank and said cutters, the number of traversals corresponding to the number of grooves to be formed;

rotating said blank in timed relation to the traversing movement to provide a desired groove helix angle;

respectively cutting opposite concave flanks of a given groove only during successive groove-forming traversals;

concurrently cutting only opposite and remote concave flanks of adjacent grooves during each groove-forming traversal; and, angularly advancing the blank with respect to the cutters by a one-groove increment between each groove-forming traversal.

3. The method for machining the concave flanks and the crest edges of spaced helical grooves on a rotor blank by means of a milling machine having a longitudinally movable table and a rotatable arbor, comprising these steps:

mounting right-hand and left-hand formed profile cutters in spaced parallel relation upon said arbor, said cutters having cutting edges extending substantially on one side only;

rotatably mounting a rotor blank upon said table with the rotary axis of said blank disposed in parallelism with the longitudinal axis of said table;

effecting rotation of said arbor and said cutters;

effecting longitudinal movement of said table and said blank to provide a relative traversal of said blank and said cutters in groove-cutting engagement;

concurrently cutting only opposite and remote concave flanks and crest edges of adjacent grooves during said traversal;

angularly indexing said blank at the completion of said traversal to shift said cutters to an adjacent groove, whereby opposite crest edges of a given groove are respectively cut only during successive traversals; and, effecting a number of groove-cutting traversals corresponding to the number of grooves to be formed.

References Cited by the Examiner
UNITED STATES PATENTS

| | | |
|---|---|---|
| 1,614,558 | 1/27 | Kasley. |
| 1,759,333 | 5/30 | Wildhaber _____ 90—1.6 X |

FOREIGN PATENTS

| | | |
|---|---|---|
| 574,988 | 1/46 | Great Britain. |

WILLIAM W. DYER, Jr., *Primary Examiner.*